US010185769B2

(12) United States Patent
Tseng

(10) Patent No.: US 10,185,769 B2
(45) Date of Patent: Jan. 22, 2019

(54) PRESENTING IMAGES AS SEARCH RESULTS

(75) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/156,219

(22) Filed: Jun. 8, 2011

(65) Prior Publication Data
US 2012/0317097 A1 Dec. 13, 2012

(51) Int. Cl.
G06F 17/30 (2006.01)

(52) U.S. Cl.
CPC .............. *G06F 17/30864* (2013.01)

(58) Field of Classification Search
CPC ......... G06F 17/30005; G06F 17/30017; G06F 17/30244
USPC .................................................. 707/765–767
See application file for complete search history.

(56) References Cited

U.S. PATENT DOCUMENTS

| 7,313,760 | B2 * | 12/2007 | Grossman et al. ........... 715/708 |
| 7,487,145 | B1 * | 2/2009 | Gibbs et al. ........... 707/999.004 |
| 7,555,478 | B2 | 6/2009 | Bayley |
| 7,725,451 | B2 | 5/2010 | Jing |
| 7,941,762 | B1 * | 5/2011 | Tovino et al. ................ 715/816 |
| 8,316,037 | B1 * | 11/2012 | Garg ................. G06F 17/30864 707/758 |
| 2006/0206454 | A1 | 9/2006 | Forstall |
| 2007/0042800 | A1 | 2/2007 | Tani |
| 2007/0174790 | A1 | 7/2007 | Jing |
| 2008/0065617 | A1 * | 3/2008 | Burke ............... G06F 17/30864 707/999.005 |
| 2008/0222256 | A1 * | 9/2008 | Rosenberg et al. ........... 709/206 |
| 2009/0043844 | A1 * | 2/2009 | Zimmet ............... G06Q 10/107 709/204 |
| 2009/0287655 | A1 | 11/2009 | Bennett |
| 2009/0287669 | A1 | 11/2009 | Bennett |
| 2010/0306191 | A1 | 12/2010 | LeBeau |
| 2011/0078184 | A1 * | 3/2011 | Song et al. .................... 707/770 |
| 2011/0078188 | A1 * | 3/2011 | Li et al. ......................... 707/776 |
| 2011/0087661 | A1 * | 4/2011 | Quick et al. .................. 707/732 |

FOREIGN PATENT DOCUMENTS

| JP | 2004-062227 | 2/2004 |
| JP | 2005-050135 | 2/2005 |
| JP | 2007-219825 | 8/2007 |

(Continued)

OTHER PUBLICATIONS

International Search Report and Written Opinion for International Application No. PCT/US2012/0404649, dated Nov. 28, 2012.

(Continued)

Primary Examiner — Khanh B Pham
(74) Attorney, Agent, or Firm — Baker Botts L.L.P.

(57) ABSTRACT

In one embodiment, accessing a set of characters of a search query currently entered into a text entry box; compiling a first set of search results based on the set of characters currently entered into the text entry box, wherein the compiling is re-executed responsive to changes to the set of characters entered into the text entry box; associating an image with each search result from the first set of search results; and presenting the first set of search results as a first set of images adjacent to the text entry box.

19 Claims, 7 Drawing Sheets

(56) References Cited

FOREIGN PATENT DOCUMENTS

| JP | 2010503931 A | 2/2010 |
|---|---|---|
| JP | 2010-277178 | 12/2010 |
| KR | 20020075600 A | 10/2002 |

OTHER PUBLICATIONS

Notification of Reasons for Rejection for Japanese Patent Application No. 2014-514516, dated Mar. 8, 2016.
Noriyuki Nakai, "Be an expert in Internet search!—How to expertly use Google," Asahi Personal Computer, The Asahi Shimbun Co., Japan, vol. 311, p. 80-85, dated May 15, 2002.
Australian Patent Examination Report No. 1 for Patent Application No. 2012268558, dated Jul. 2, 2016.
Communication of Result of Substantive Examination for MX/a/2016/008967, dated Sep. 28, 2017.
Decision of Rejection for JP 2014-514516, dated Mar. 1, 2017.
Examination Report No. 1 for Standard Patent Application No. 2017202513, dated Mar. 2, 2018.
Office Action and Examination Report for CA Patent Application No. 2,837,426, dated Mar. 7, 2018.
KR Office Action received from KIPO for Patent Application No. 10-2014-7000167. (with English Translation) dated Sep. 27, 2018.
JP Office Action received from JPO for Patent Application No. 2017-130244. (with English Translation) dated Oct. 16, 2018.

\* cited by examiner

PRESENTING IMAGES AS SEARCH RESULTS

BACKGROUND

The Internet provides a vast amount of information, which may be stored at many different sites and on many different devices, such as on servers and clients or in databases, around the world. These different devices at the different sites are communicatively linked to computer or communication networks over wire-line or wireless connections. A person may access specific pieces of information available on the Internet using a suitable network device (e.g., a computer, a smart mobile telephone, an entertainment console, etc.) connected to a network.

Due to the sheer amount of information available on the Internet, it is impractical as well as impossible for a person (e.g., a network user) to manually search throughout the Internet for the specific pieces of information he needs. Instead, most network users rely on different types of computer-implemented tools to help them locate the desired information. One of the most commonly and widely used computer-implemented tools is a search tool, also referred to as a search engine. To search for information relating to a specific topic on the Internet, a user typically provides a few words, often referred to as a "search query" or simply "query", describing the topic to a search tool. The search tool conducts a search based on the search query using various search algorithms and generates a set of search results, each corresponding to some information that is most likely to be related to the search query. The search results are then presented to the user.

Sophisticated search tools implement many other functionalities in addition to merely identifying the search results as a part of the search process. For example, a search tool usually ranks the identified search results according to their relative degrees of relevance with respect to the search query, such that the search results that are relatively more relevant to the search query are ranked higher than and consequently are presented to the network user before the search results that are relatively less relevant to the search query. There are continuous efforts to improve the quality of the search results generated by the search tools.

SUMMARY

This disclosure generally relates to presenting search results identified for search queries.

Particular embodiments may access a set of characters of a search query currently entered into a text entry box; compile a first set of search results based on the set of characters currently entered into the text entry box, wherein the compiling is re-executed responsive to changes to the set of characters entered into the text entry box; associate an image with each search result from the first set of search results; and present the first set of search results as a first set of images adjacent to the text entry box.

These and other features, aspects, and advantages of the disclosure are described in more detail below in the detailed description and in conjunction with the following figures.

DESCRIPTION OF EXAMPLE EMBODIMENTS

Figure 1:
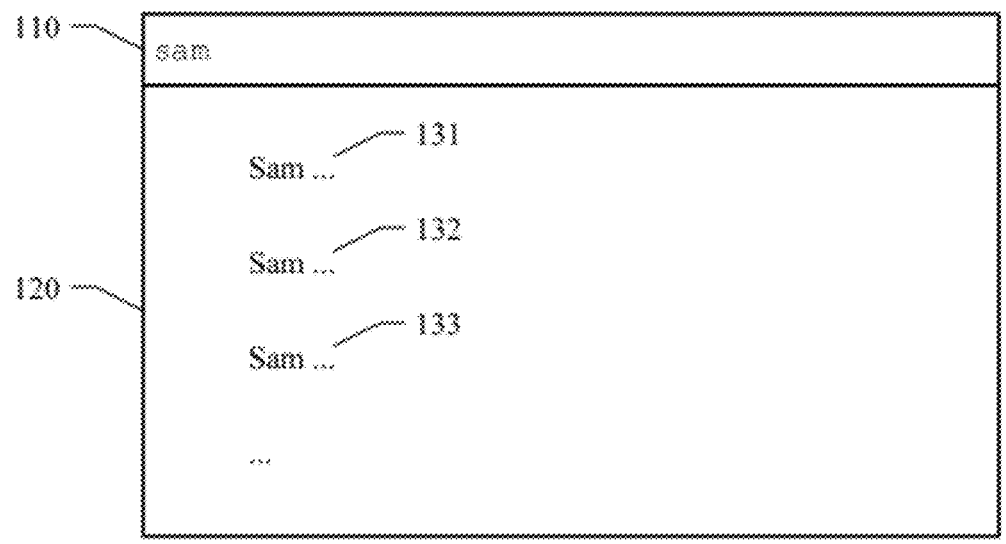
FIG. 1 illustrates an example set of search results.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A computer-implemented search tool is designed to search for information relevant to specific topics from one or more information sources, such as the Internet or an Intranet. To conduct a search, a user may issue a search query to the search tool. The search query generally contains one or more words that describe a topic. In response, the search tool may identify a set of search results, each corresponding to some information that is likely to be related to the search query. The set of search results may be ranked based on any number of factors and presented to the user according to their respective ranks.

In particular embodiments, each search result may be presented to the user in the form of an image, which may represent, describe, or be relevant to the search result. For example, when presenting the search results to the user by displaying the images respectively associated with the search results on the screen of a client device (e.g., a computer or a smart phone) used by the user, each portion of the screen reserved for a specific search result is substantially consumed by the image associated with that search result.

Type Ahead

In particular embodiments, the search tool may implement the "type ahead" feature, also known as "incremental search", "incremental find", or "real-time suggestions", which is a user interface interaction method to progressively search for and filter through texts (e.g., search queries). As a user types the text of a search query, one or more possible matches for the text are found and immediately presented to the user. This immediate feedback often allows the user to stop short of typing the entire word or phrase of the search query. The user may also choose a closely related option from the presented list. In addition, in particular embodiments, as the user types each character of a search query, a set of search results corresponding to the text thus far typed may be presented to the user immediately. The search results may be updated each time the user further types a character.

For example, suppose that a user wants to search for a person, and begins to input the person's name as the search query. The user first types the character "s" (e.g., in an input field included in a user interface). At this point, some of the names that begin with the letter "s" (e.g., Sam, Sara, Sharon, Steven, etc.) may be suggested to the user. In addition, a set of search results corresponding to one of the suggested names (e.g., the first suggested name, Sam) may be presented to the user as well. Suppose that the user next types in the character "a". At this point, some of the names that begin with the letters "sa" (e.g., Sam, Sandra, Sara, Sasha, Saul, etc.) may be suggested to the user. In addition, a set of search results corresponding to one of the suggested names (e.g., Sandra) may be presented to the user as well. This process may continue until the user finishes typing the name or selects one of the suggested names. Type ahead is described in more detail in U.S. patent application Ser. No. 12/816,377, entitled *"Search and Retrieval of Objects in a Social Networking System"*, filed on 15 Jun. 2010, which is hereby incorporated by reference in its entirety and for all purposes.

Figure 2:
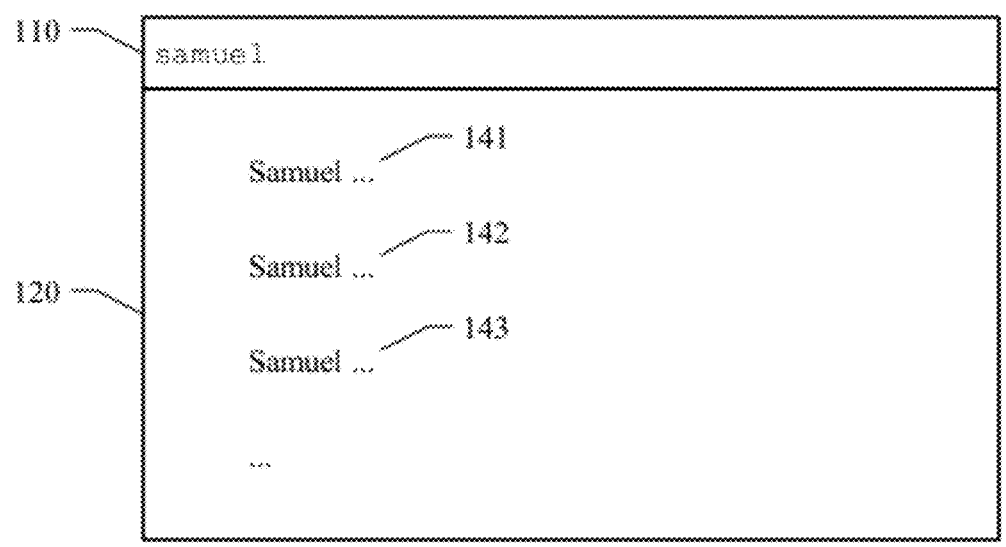
FIG. 2 illustrates an example set of search results.

FIGS. 1 and 2 illustrates two example sets of search results incorporating the "type ahead" feature. In the example user interface illustrated in FIG. 1, there may be an input field 110 through which a user may provide search queries, and an output field 120 in which search results may be displayed. As the user types the word "sam" in input field 110, a set of search results 131, 132, 133 compiled based on search query "sam" may be presented to the user in output field 120. Suppose that the user continues to type in input field 110 so that the word becomes "samuel", as illustrated in FIG. 2. At this point, a new set of search results 141, 142, 143 may be compiled based on search query "samuel". This new set of search results 141, 142, 143 may be displayed in output field 120, replacing the previous set of search results 131, 132, 133.

In theory, as soon as the user types in a single character (e.g., "s") in input field 110, a set of search results may be compiled based on that character and displayed in output field 120. In addition, each time the user types in an additional character in input field 110, thus changing the search query, a new set of search results may be compiled based on the characters thus far provided by the user and displayed in output field 120. In practice, however, the search tool may not compile and present a set of search results each and every time the user enters a new character in input field 110. For example, after the user enters the first character "s", a single character may be too ambiguous to serve as a search query, and there may be too many possible search results that may be considered relating to the single character "s", such that even if a set of search results is compiled based on the single character "s" and presented to the user, it may not be very useful to the user. Therefore, the search tool may choose not to compile any search result at this point and wait for additional input from the user. After the user enters two additional characters "a" and "m", the three characters "s", "a", and "m" now form a meaningful word, and thus a meaningful search query. At this point, the search tool may choose to compile a set of search results based on search query "sam" and present it to the user in output field 120.

When typing search queries, a user can occasionally enter wrong characters as part of the search phrase. Using past knowledge of the particular user's search queries, general user search queries, the layout of the current keyboard on the device, and a definition of the language or languages the user is likely to be typing in may help and enable the search tool to "guess" the likely search phrase intended by the user even when an incorrect character has been entered. For example, the character "w" on a standard US QWERTY keyboard is most closely surrounded by the characters "q", "e", "a", "s", and "d". If a user types "s" followed by "w", then it is possible that instead of "sw", the user may have intended to enter "sa" or "se". If there are search results exist for "sa" or "se", they may be displayed (e.g., in addition to or instead of the search results for "sw"), optionally with an indicator that an auto-correction has temporarily been applied. This reduces the need for the user to correct the search query before tapping on the search results.

Intelligent Server Request

Figure 3:
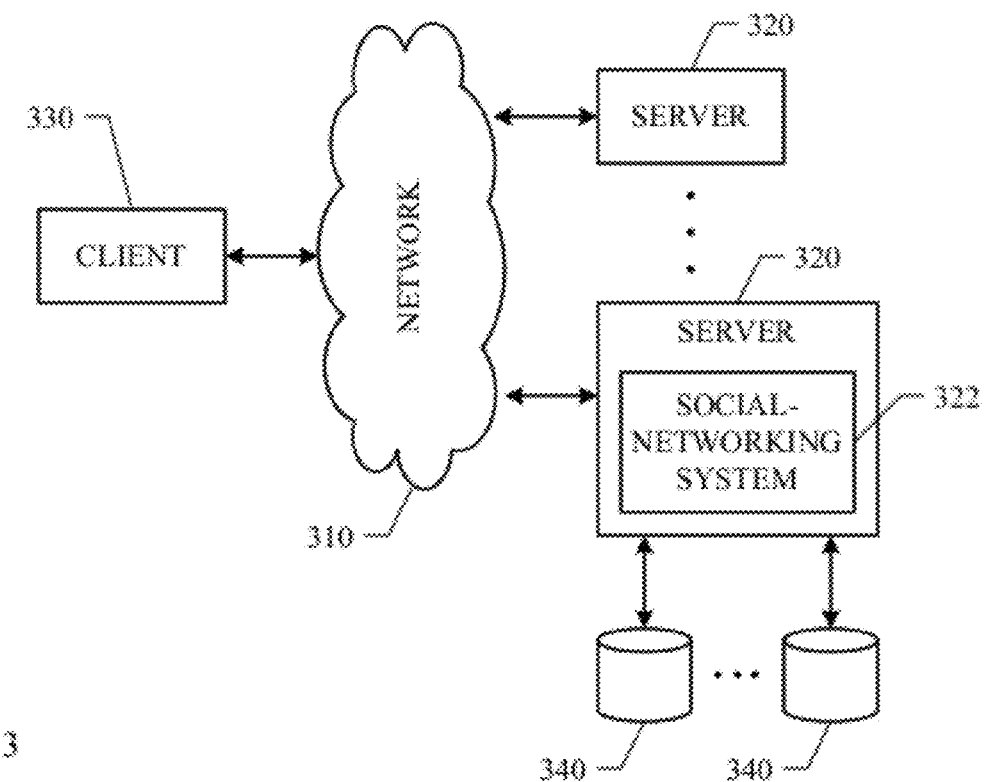
FIG. 3 illustrates an example system for conducting searches.

In particular embodiments, a user may conduct searches using a suitable client device, such as, for example and without limitation, a desktop computer system, a notebook computer system, a netbook computer system, a handheld electronic device, or a mobile telephone. The client device may or may not be connected to a network. FIG. 3 illustrates an example client device 330 connected to a network 310. In particular embodiments, client device 330 may be an electronic device including hardware, software, or embedded logic components or a combination of two or more such components and capable of carrying out the appropriate functionalities implemented or supported by client 330.

In addition, there may be any number of servers 320 connected to network 310. In particular embodiments, each server 320 may be a unitary server or may be a distributed server spanning multiple computers or multiple datacenters. Each server 320 may include hardware, software, or embedded logic components or a combination of two or more such components for carrying out the appropriate functionalities implemented or supported by server 320. In particular embodiments, a social-networking system 322, implementing a social-networking website, may be hosted on one or more servers 320. Social-networking system 322 is described in more detail below.

In particular embodiments, one or more data storages 340 may be communicatively linked to one or more severs 320. In particular embodiments, data storages 340 may be used to store various types of information, such as information associated with social-networking system 322. In particular embodiments, the information stored in data storages 340 may be organized according to specific data structures.

When conducting a search based on a search query, the information from which a set of search results is compiled may be obtained from multiple information sources. For example, there may be data stored on the client device used by the user (e.g., client device 330) itself, and some of the search results may be obtained from the data locally stored on the client device. In addition, if the client device is connected to a network (e.g., network 310) at the time the search is conducted, then some of the search results may be obtained from data remotely stored on servers (e.g., server 320) or databases (e.g., databases 340) that are accessible to the client device via the network. In particular embodiments, the user requesting the search may be a member of a social-networking system (e.g., social-networking system 322). The social-networking system may contain various types of information. Some of the search results may be obtained from the data associated with the social-networking system. Some of the search results may also be obtained from data publically available on the Internet.

For example, when conducting a search based on search query "sam", the search tool may determine: (1) if there is any person named "Sam" among the contacts stored on the user's smart phone, through which the user is requesting the search; (2) if there is any person named "Sam" among the social connections of the user in the social-networking system; and (3) if there is any content or resource associated with the word "sam" on the Internet. The search results compiled may be based on information obtained from all of these sources. For example, the search results may include: (1) a friend of the user named "Sam" from the contacts stored on the user's smart phone; (2) two social connections of the user, both named "Sam", from the social-networking system; and (3) several web pages on the Internet relating to "sam".

In particular embodiments, the search tool may implement a feature that may be referred to as "intelligent server request". When a search query is received, the search tool first identifies search results from the data locally stored on the user's client device. If the search result the user is looking for is found among the data locally stored on the user's client device, then it may not be necessary to obtain additional search results from remote servers via a network. In particular embodiments, only when necessary (e.g., when the search result the user is looking for is not found among the data locally stored on the user's client device) does the search tool request and download additional search results from remote servers.

For example, upon receiving the search query "sam", the search tool may first search the contact list stored on the user's smart phone, through which device the user is requesting the search. If a contact named "Sam" is found among the contact list stored on the user's smart phone, then the search tool may present this contact and his information (e.g., email address or phone number) to the user as a search result. If the user interacts with this search result (e.g., starting to call the contact), then this may indicate that the user has already found the information he is looking for and there is no need to request additional search results from remote servers. On the other hand, if the user ignores this search result, then this may indicate that this contact is not the "Sam" the user is looking for, and the search tool may obtain additional search results relating to "sam" from remote servers (e.g., from servers associated with the social-networking system or servers hosting websites on the Internet).

In particular embodiments, certain data (e.g., frequently accessed information) may be cached locally on a client device. The search tool may obtain search results from the cached data and data locally stored on the client device, as well as from data stored on remote devices (e.g., servers and databases). In particular embodiments, with the "type ahead" feature supported by a search tool, as a user begins entering characters that form a search query, the search tool first identifies search results from the cached data or data locally stored on the user's client device. Only after a threshold number of characters (e.g., two or three characters) have been entered by the user does the search tool begin retrieve search results from remote information sources (e.g., servers or databases) over the network.

When search results are obtained from the data locally stored on the user's client device as well as from the data stored on the remote servers, in particular embodiments, the search results may be presented to the user (e.g., displayed on the user's client device) as soon as they become available. For example, the search results obtained from the data locally stored on the user's client device often become available immediately or very shortly after the search query is received. These search results may be presented to the user immediately after they become available. If additional search results are subsequently obtained from the data stored on the remote servers, then these additional results may be presented to the user as they become available (e.g., adding to the search results already presented to the user).

User Interface

In particular embodiments, a set of search results compiled in response to a search query may be ranked prior to being presenting to the user, so that higher-ranked search results may be presented to the user before lower-ranked search results. In particular embodiments, when ranking a set of search results with respect to a search query, many different factors may be considered. For example, the content of each search result may be analyzed to determine its degree of relevance to the search query. In addition, particular embodiments may rank the search results based on factors such as, for example and without limitation, the context in which the search is being conducted, the nature or characteristics of the topic described by the search query, the time when and the location where the search is requested, and the social-networking information and the behavior profile of the user requesting the search.

In particular embodiments, each search result may be associated with an image. The image may represent, describe, or be relevant to the corresponding search result. For example, if the search result is a person, the associated image may be a photograph (such as a user profile photo) of the person showing his or her face. If the search result is a business, the associated image may be the logo of the business. If the search result is a place, the associated image may be a photograph showing some representative or recognizable characteristics of the place. Different search results may have different associated images.

Figure 4:
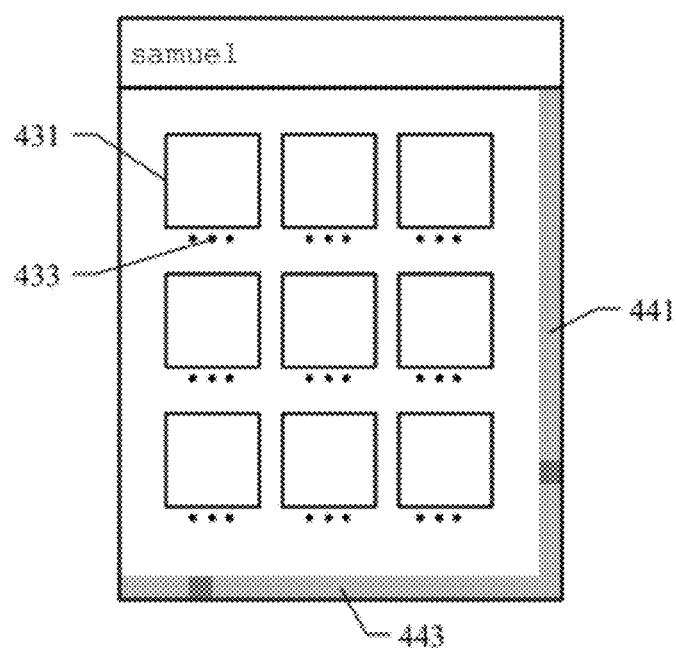
FIGS. 4-9 illustrates example user interfaces for presenting search results as images.
Figure 5:
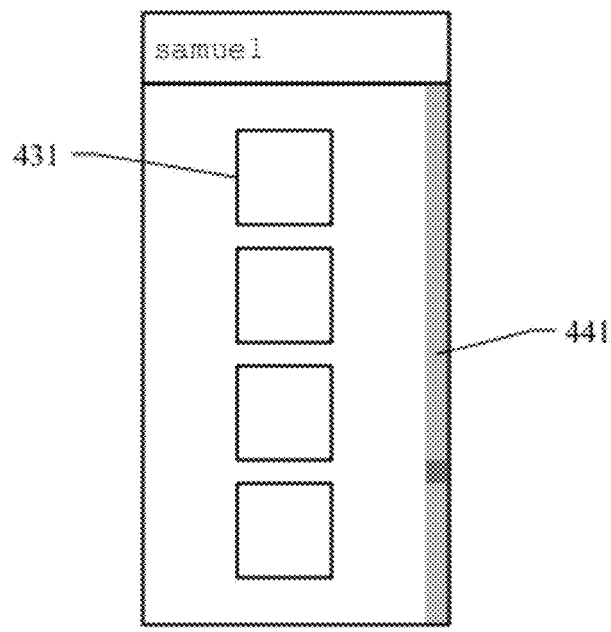
Figure 6:
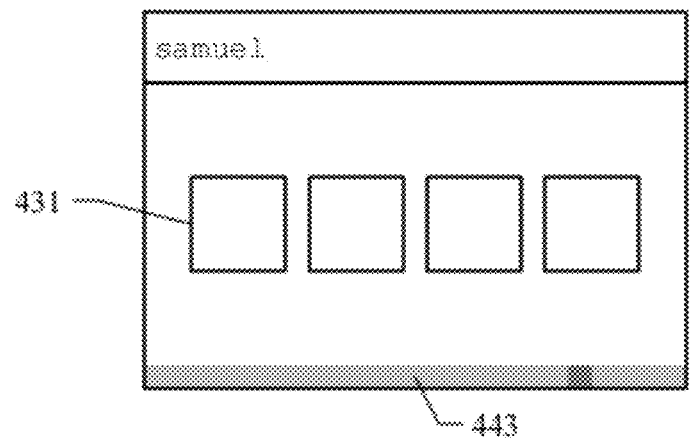
Figure 7:
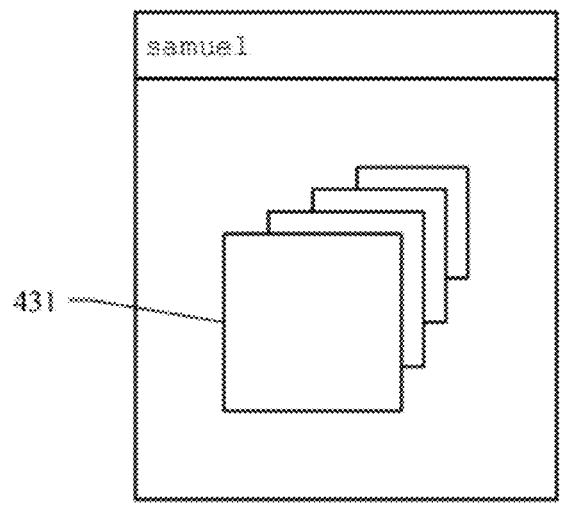
Figure 8:
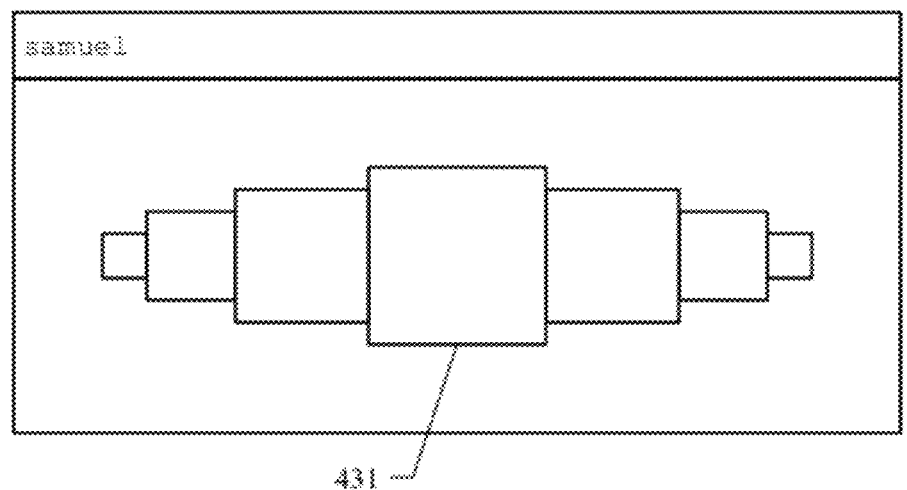
Figure 9:
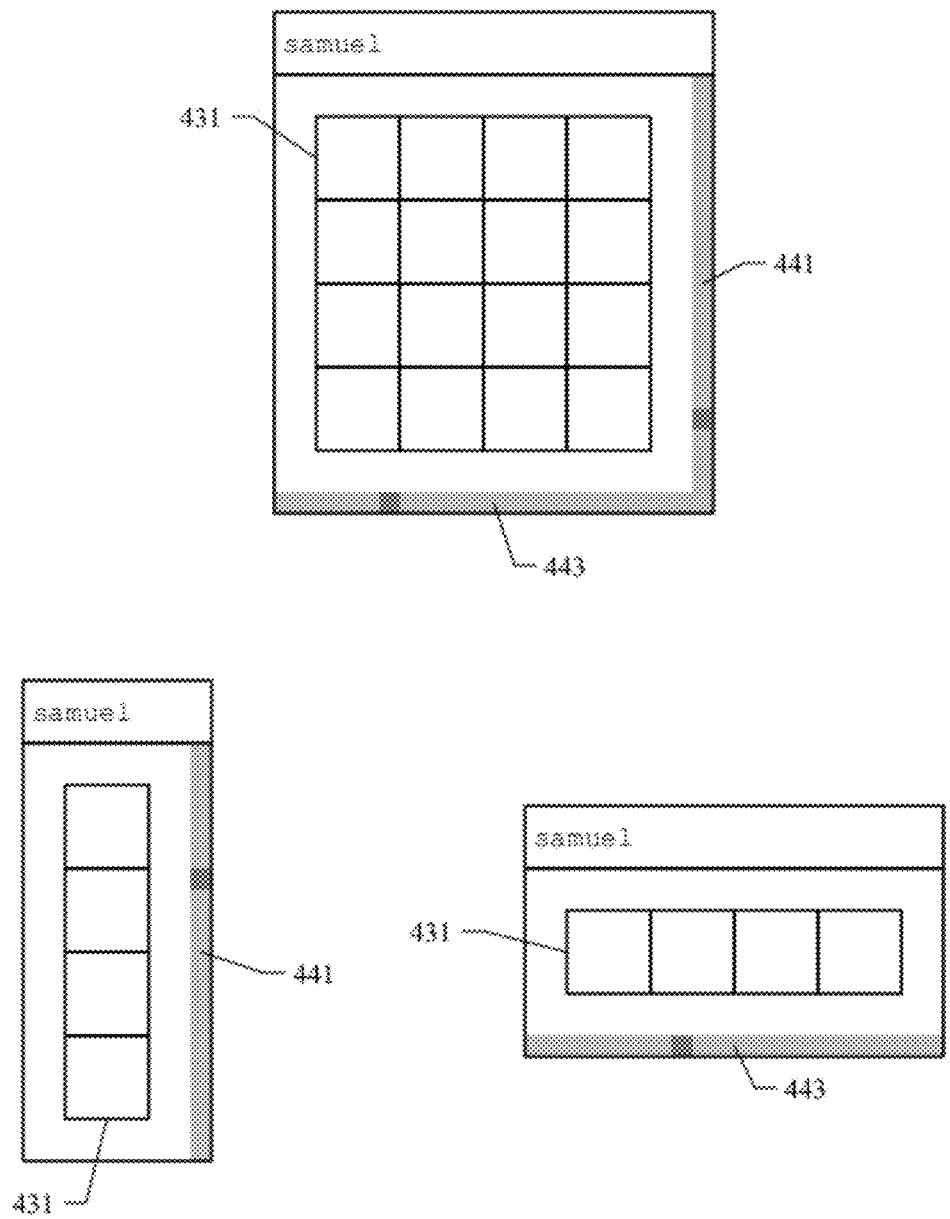

In particular embodiments, presenting the search results to the user is achieved by displaying the images respectively associated with the search results on the screen of the user's client device. FIGS. 4-9 illustrates several example arrangements for displaying a set of images (e.g., icons) corresponding to a set of search results. In FIG. 4, images 431 are arranged in a grid. There is a vertical slider bar 441 and a horizontal slider bar 443. The user may use these slider bars to page through the images. In particular embodiments, there may be text description 433 associated with some images 431. However, these text descriptions 433 are secondary to images 431. In FIG. 5, images 431 are arranged vertically in a column. Vertical slider bar 441 may be used to page through the images. In FIG. 6, images 431 are arranged horizontally in a row. Horizontal slider bar 443 may be used to page through the images. In FIG. 7, images 431 are arranged in a stack. The user may view each image 431 by brining it to the top of the stack. The sizes of images 431 increase as they are near the top of the stack and decrease as they are near the bottom of the stack. In FIG. 8, images 431 may be arranged in a different type of stack, where the middle image has the largest size and the images on each side have decreasing sizes. The user may view each image 431 by brining it to the center of the stack. In FIG. 9, images 431 may be arranged directly adjacent to each other, with their edges touching, in a gird, column, or row. Other arrangements are also possible and the present disclosure contemplates any suitable arrangement. Some of the example arrangements (e.g., those illustrated in FIGS. 7-9) are more compact than others so that more number of images may be packed within a relatively small area. Some of the example arrangements allow the images to be "wrapped around" the display screen.

In particular embodiments, when displaying a set of images corresponding to a set of search results on the screen of a user's client device, regardless of which arrangement is used, each search result is assigned a portion of the screen, and the image associated with the search result substantially consumes or occupies the portion of the screen assigned to the corresponding search result. In particular embodiments, the images corresponding to the search results may be displayed adjacent to the input field (e.g., a text entry box) where the search query is entered by the user.

Although in some embodiments, there may be text description displayed in addition to the image for a search result, as illustrated in FIG. 4, the text description is minor and secondary (e.g., in size or placement) in comparison to the image. In other embodiments, only an image is displayed for each search result (i.e., no text description or any other element), as illustrated in FIGS. 5-9. This allows the images corresponding to the search results to be displayed in very compact forms, such as the tiling, overlay, and directly adjacent (i.e., edges touching) arrangements illustrated in FIGS. 7-9. Such compact arrangements are especially suitable for devices (e.g., mobile devices) that have relatively small screens, as more images may be packed within a relatively small display area.

Sometimes, a client device may include an input component (e.g., a mouse or a touch screen) that supports the "hover" feature. For example, with a mouse, the user may use the mouse to move the curser above an image without making any mouse click, so that the curser is hovering above the image. With a touch screen, the hover behavior may be simulated with a long press, where the user presses and holds his finger against the touch screen. In particular embodiments, with a client device that supports the "hover" feature, when the cursor hovers over images 431, it may cause images 431 to be paged through one at a time.

A user interface in connection with a search tool that supports "type ahead" and presents search results as images, such as those illustrated in FIGS. 4-8, may be incorporated into a variable of different contexts, such as, for example and without limitation, a search bar local to a client device, an address input field in an email user interface or other messaging systems, or the user interface of any applicable software application executing on a client device.

Figure 10:
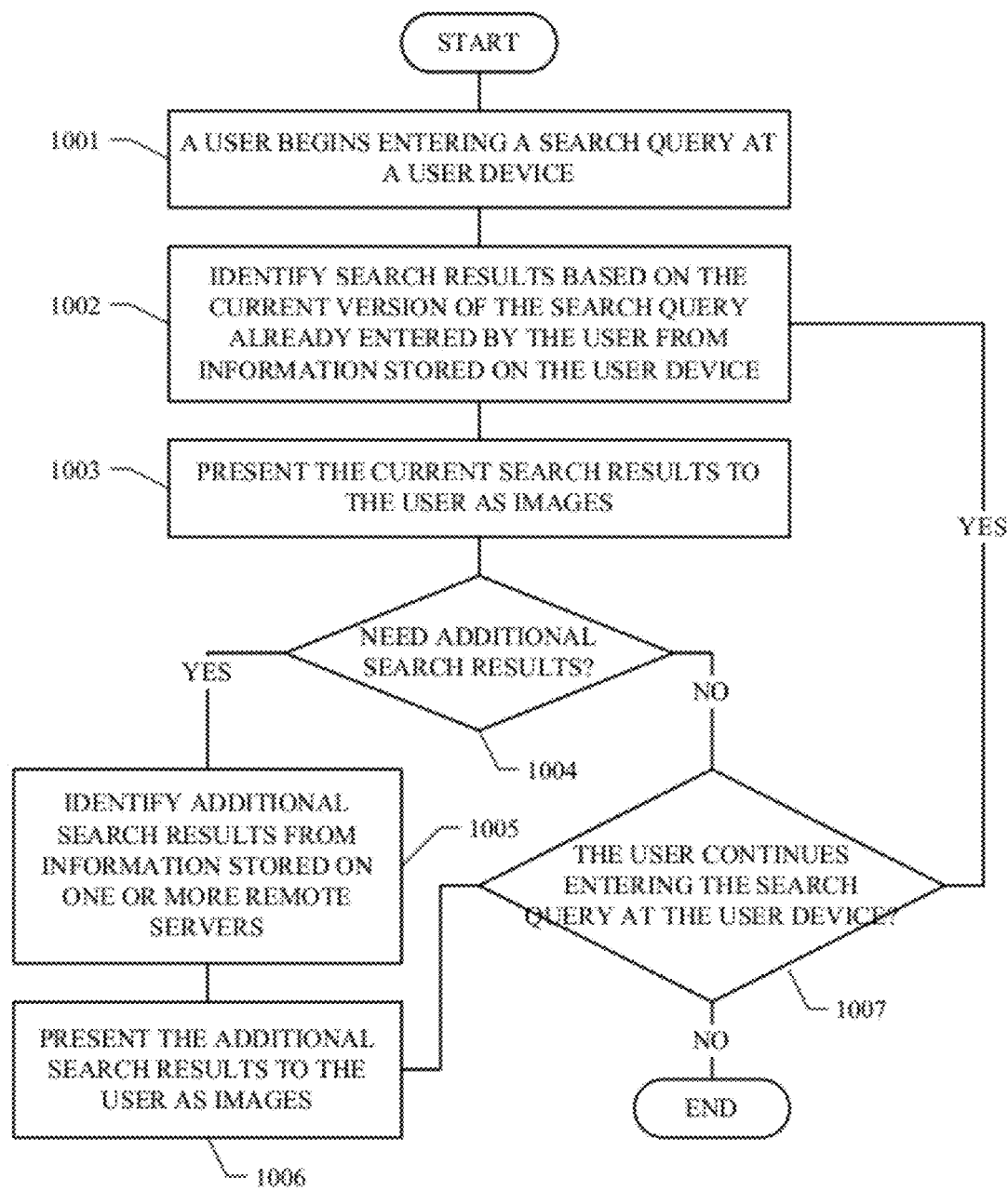
FIG. 10 illustrates an example method for conducting searches.

FIG. 10 illustrates an example method for presenting images as search results. In particular embodiments, a user may being entering a search query at a user or client device, as illustrated in STEP 1001. Particular embodiments may identify a set of search results based on the current version of the search query thus far entered by the user from the information stored on the user device, as illustrated in STEP 1002. This set of search results may be presented to the user as a set of images (e.g., the images are displayed on the screen of the user device), as illustrated in STEP 1003.

Particular embodiments may determine whether additional search results are needed, as illustrated in STEP 1004. For example, there may not be any information stored on the user's client device that are related or closely related to the current version of the search query. Or, the user may not find the search results already presented to him adequate for his needs (e.g., none of the search results already presented to the user is what he is looking for). If additional search results are needed, particular embodiments may identify additional search results from information stored on one or more remote severs, as illustrated in STEP 1005, and present these additional search results to the user as images, as illustrated in STEP 1006.

Given a set of search results, particular embodiments may rank the search results based on their relative degrees of relevance to the search query as well as information contained in a social-networking system. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, organize events, etc.

A social-networking system may contain a vast amount of information related to its users. Such information is not limited to the social connections of the individual users, but may include, for example and without limitation, demographical information, network or social activities, behavior profiles, and personal preferences, interests, or hobbies of the individual users. Particular embodiments may represent the information contained in a social-networking system using a graph that may have any number of nodes and edges, an example of which is illustrated in FIG. 11.

Figure 11:
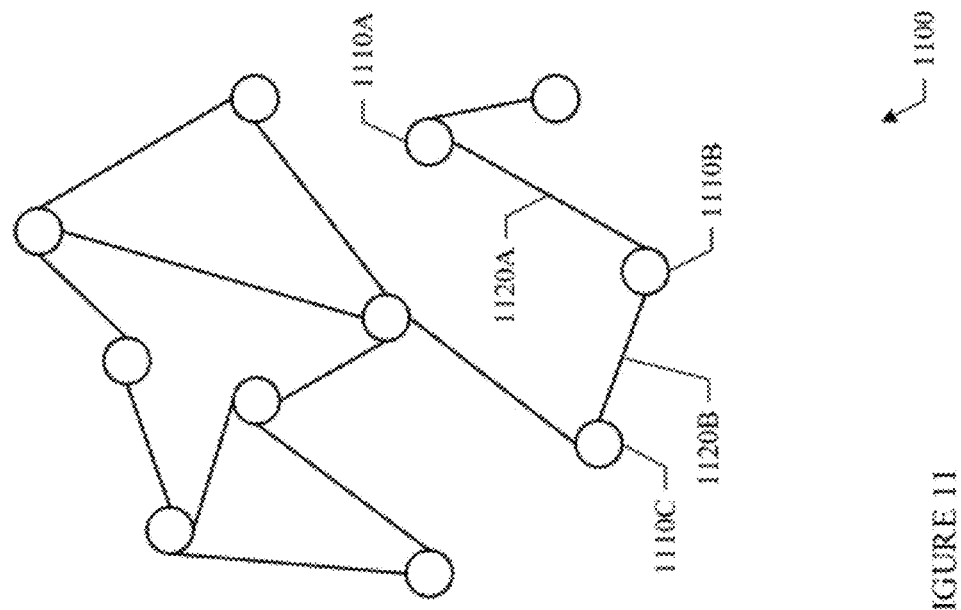
FIG. 11 illustrates an example graph that represents the information contained in a social-networking system.

In graph 1100 illustrated in FIG. 11, each node may represent an entity, which may be human (e.g., user of the social-networking system) or non-human (e.g., location, event, action, business, object, message, post, image, web page, news feed, etc.). Two nodes are connected with an edge if the two nodes are related in some way (i.e., there is a relationship between the two nodes). Example cases when two nodes in graph 1100 may be related and thus connected with an edge may include, without limitation, (1) the two nodes represent two users of a social-networking system respectively, and the two users are socially connected (e.g., friends of each other); (2) the two nodes represent a user of the social-networking system and an event respectively, and the user has attended the event; (3) the two nodes represent a user of the social-networking system and a location, and the user has been to the location; (4) the two nodes represent a user of the social-networking system and the user has interacted with (e.g., viewed) the web page; (5) the two nodes represent an event and a location respectively, and the event is held at the location; (6) the two nodes represent a user of the social-networking system and an image (e.g., a digital photograph) respectively, and the user is in the image; (7) the two nodes represent a user of the social-networking system and a product (e.g., a mobile telephone) respectively, and the user owns and uses the product; and (8) the two nodes represent a user of the social-networking system and a software application (e.g., a web-based game) respectively, and the user uses the application (e.g., plays the game). A connection may exist between two humans, a human and a non-human entity, and two non-human entities. Any type of relationship between two human or non-human entities may result in a connection between the two entities.

In graph 1100, when there is an edge between two specific nodes, the two nodes may be considered directly related. For example, edge 1120A connects nodes 1110A and 1110B, and thus nodes 1110A and 1110B are directly related. Similarly, edge 1120B connects nodes 1110B and 1110C, and thus nodes 1110B and 1110C are directly related. When there is no edge between two particular nodes, the two nodes may still be considered indirectly related. For example, there is no edge directly connecting nodes 1110A and 1110C; however, nodes 1110A and 1110C may still be considered indirectly related through node 1110B.

With respect to node 1110A, node 1110B has a closer relationship to it than node 1110C, because in graph 1100, it takes one hop to go from node 1110A to node 1110B, but it takes two hops to go from node 1110A to node 1110C (i.e., through node 1110B). In particular embodiments, with respect to two specific nodes, the less number of hops it takes to go from one node to another node, the closer the two nodes are related.

Particular embodiments may use such a graph to help identify and rank search results. In particular embodiments, such a graph may be used to compute, for each node in the graph, a coefficient that indicates its relationship to the node corresponding to the user requesting the search. This coefficient may be used to help rank the set of search results. In particular embodiments, each search result may correspond to a node in the graph as well.

The search results, once ranked, may be presented to the user according to their respective ranks. If the user continues to enter additional characters for the search query, as illustrated in STEP 1007, then particular embodiments may identify a new set of search results based on the now current version of the search query thus far entered by the user (i.e., the search query with the additional characters) and repeat STEPS 1002-1007. This process may continue until the user stops entering the search query.

Figure 12:
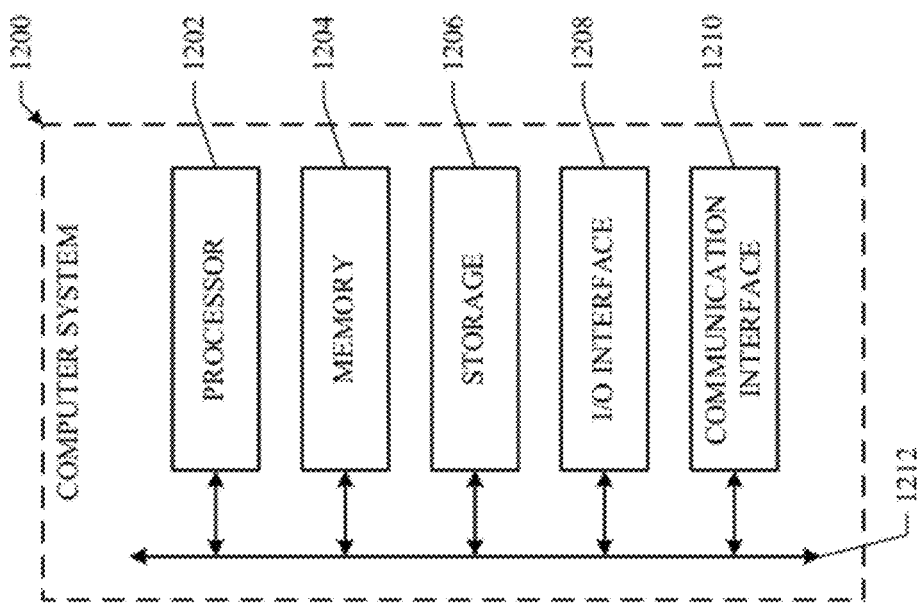
FIG. 12 illustrates an example computer system.

Particular embodiments may be implemented on one or more computer systems. For example, the process illustrated in FIG. 10 may be implemented as computer software stored in non-transitory computer-readable medium. FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1200 may include one or more computer systems 1200; be unitary or distributed; span multiple locations; span multiple machines; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include an HDD, a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1202 (such as, for example, one or more internal registers or caches), one or more portions of memory 1204, one or more portions of storage 1206, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client device of a user of an online social network:
   receiving, by the client device, one or more characters of a search query inputted by the user into a text-entry box, the user being associated with a first node of a social graph of the online social network;
   compiling, by the client device, responsive to receiving the search query, a first set of search results associated with one or more second nodes of the social graph, wherein the first set of search results are received from information stored on an internal cache of the client device, wherein each of the search results of the first set of search results corresponds to a second node of the one or more second nodes that is within a threshold degree of separation from the first node of the user, and wherein each search result corresponds to a web page associated with one of the second nodes;
   providing, by the client device, for display to the user a list of the first set of search results adjacent to the text-entry box, each search result being interactable with the user to retrieve the corresponding web page associated with the respective second node;
   determining, by the client device, whether additional search results beyond the displayed first set of search results are needed to be obtained from a remote server of the online social network based on receiving no user interaction with respect to any search results of the first set of search results and receiving an indication that a threshold number of characters has been inputted by the user;
   if there is a positive determination that additional results beyond the displayed first set of search results are needed to be obtained from the remote server of the online social network, then:
      sending, from the client device to the remote server of the online social network, an additional request to execute the search query on the remote server;
      receiving, at the client device from the remote server of the online social network, a second set of search results associated with one or more third nodes of the social graph, the second set of search results received from the remote server being different from the first set of search results received from the internal cache of the client device; and
      providing, by the client device, for display to the user a list of the second set of search results adjacent to the text-entry box; and
   if there is a determination that no additional results beyond the displayed first set of search results are needed, then not sending the additional request to the remote server of the online social network to execute the search query.

2. The method of claim 1, further comprising:
   receiving one or more additional characters of the search query inputted by the user into the text-entry box, wherein at least one of the first set of search results and the second set of search results is displayed to the user prior to receiving the one or more additional characters.

3. The method of claim 1, wherein providing for display to the user the list of the first set of search results comprises:
   assigning a portion of a screen of the client device to each of one or more search results in the first set of search results and the second set of search results; and
   displaying an image associated with each of the one or more search results in the first set of search results and the second set of search results in the portion of the screen assigned to the respective search result, wherein the image substantially consumes the portion of the screen.

4. The method of claim 3, wherein each of the one or more images associated with the first set of search results corresponds to the respective second node, the one or more images being selected based on selecting an image from one or more images associated with the respective second node, and wherein each of the one or more images associated with the second set of search results corresponds to the respective third node, the one or more images of the second set of search results being selected based on selecting an image from one or more images associated with the respective third node.

5. The method of claim 1, wherein the threshold degree of separation comprises a single degree of separation, two degrees of separation, or any degree of separation.

6. The method of claim 1, further comprising:
for each search result in the first set of search results, computing a coefficient of the search result, wherein the coefficient is based on an affinity measure of the user for the search result, the affinity measure being based in part on a degree of separation between the node associated with the search result and a user node of the social graph, and the user node corresponding to the user requesting the search.

7. The method of claim 1, wherein the one or more second nodes are different from the one or more third nodes.

8. The method of claim 1, wherein each of the search results in the first set of search results matches the characters of the search query.

9. The method of claim 1, wherein each of the search results in the second set of search results matches the characters of the search query.

10. The method of claim 1, wherein the search query comprises N characters, and wherein the first set of search results is generated responsive to the first user inputting the Nth character.

11. The method of claim 1, wherein the search query comprises N characters, and wherein the second set of search results is generated responsive to the first user inputting an Nth+1 character.

12. The method of claim 1, each of the search results in the first set of search results comprises one or more images associated with the one or more second nodes, and each of the search results in the second set of search results comprises one or more images associated with the one or more third nodes.

13. The method of claim 1, wherein the not sending the request to the online social network is based on a determination that additional results are not needed.

14. The method of claim 1, wherein the receiving of no user interaction with respect to any search results of the first set of search results occurs within a predetermined period of time.

15. A system comprising: a memory comprising instructions executable by one or more processors; and the one or more processors coupled to the memory and operable to execute the instructions, the one or more processors being operable when executing the instructions to:
receive, by a client device of a user of an online social network, one or more characters of a search query inputted by the user into a text-entry box, the user being associated with a first node of a social graph of the online social network;
compile, by the client device, responsive to receiving the search query, first set of search results associated with one or more second nodes of the social graph, wherein the first set of search results are received from information stored on an internal cache of the client device, wherein each of the search results of the first set of search results corresponds to a second node of the one or more second nodes that is within a threshold degree of separation from the first node of the user, and wherein each search result corresponds to a web page associated with one of the second nodes;
provide, by the client device, for display to the user a list of the first set of search results adjacent to the text-entry box, each search result being interactable with the user to retrieve the corresponding web page associated with the respective second node;
determine, by the client device, whether additional search results beyond the displayed first set of search results are needed to be obtained from a remote server of the online social network based on receiving no user interaction with respect to any search results of the first set of search results and receiving an indication that a threshold number of characters has been inputted by the user;
if there is a positive determination that additional results beyond the displayed first set of search results are needed to be obtained from the remote server of the online social network, then:
send, from the client device to the remote server of the online social network, an additional request to execute the search query on the remote server;
receive, at the client device from the remote server of the online social network, a second set of search results associated with one or more third nodes of the social graph, the second set of search results received from the remote server being different from the first set of search results received from the internal cache of the client device; and
provide, by the client device, for display to the user a list of the second set of search results adjacent to the text-entry box; and
if there is a determination that no additional results beyond the displayed first set of search results are needed, then not send the additional request to the remote server of the online social network to execute the search query.

16. The system of claim 15, wherein the one or more processors are further operable when executing the instructions to:
receive one or more additional characters of the search query inputted by the user into the text-entry box, wherein at least one of the first set of search results and the second set of search results is displayed to the user prior to receiving the one or more additional characters.

17. The system of claim 15, wherein providing for display to the user list of the first set of search results comprises:
assigning a portion of a screen of a client device to each of one or more search results in the first set of search results and the second set of search results; and
displaying an image associated with each of the one or more search results in the first set of search results and the second set of search results in the portion of the screen assigned to the respective search result, wherein the image substantially consumes the portion of the screen.

18. The system of claim 17, wherein each of the one or more images associated with the first set of search results corresponds to the respective second node, the one or more images being selected based on selecting an image from one or more images associated with the respective second node, and
wherein each of the one or more images associated with the second set of search results corresponds to the respective third node, the one or more images of the second set of search results being selected based on selecting an image from one or more images associated with the respective third node.

19. One or more computer-readable non-transitory storage media embodying software operable when executed by one or more computer systems to:
- receive, by a client device of a user of an online social network, one or more characters of a search query inputted by the user into a text-entry box, the user being associated with a first node of a social graph of the online social network;
- compile, by the client device, responsive to receiving the search query, a first set of search results associated with one or more second nodes of the social graph, wherein the first set of search results are received from information stored on an internal cache of the client device, wherein each of the search results of the first set of search results corresponds to a second node of the one or more second nodes that is within a threshold degree of separation from the first node of the user, and wherein each search result corresponds to a web page associated with one of the second nodes;
- provide, by the client device, for display to the user a list of the first set of search results adjacent to the text-entry box, each search result being interactable with the user to retrieve the corresponding web page associated with the respective second node;
- determine, by the client device, whether additional search results beyond the displayed first set of search results are needed to be obtained from a remote server of the online social network based on receiving no user interaction with respect to any search results of the first set of search results and receiving an indication that a threshold number of characters has been inputted by the user;
- if there is a positive determination that additional results beyond the displayed first set of search results are needed to be obtained from a remote server of the online social network, then:
  - send, from the client device to the remote server of the online social network, an additional request to execute the search query on the remote server;
  - receive, at the client device from the remote server of the online social network, a second set of search results associated with one or more third nodes of the social graph, the second set of search results received from the remote server being different from the first set of search results received from the internal cache of the client device; and
  - provide, by the client device, for display to the user a list of the second set of search results adjacent to the text-entry box; and
- if there is a determination that no additional results beyond the displayed first set of search results are needed, then not send the additional request to the remote server of the online social network to execute the search query.

* * * * *